United States Patent
Tsuda et al.

(10) Patent No.: US 9,843,247 B2
(45) Date of Patent: *Dec. 12, 2017

(54) ROTATING ELECTRIC MACHINE

(75) Inventors: Toshihiro Tsuda, Tokyo (JP);
Mitsuhiro Kawamura, Tokyo (JP);
Kazuki Noda, Imizu (JP); Tadashi Fukami, Ishikawa (JP); Kazuo Shima, Ishikawa (JP)

(73) Assignees: Toshiba Mitsubishi-Electric Industrial Systems Corporation, Tokyo (JP);
Kanazawa Institute of Technology, Nonoichi-shi (JP)

( * ) Notice: Subject to any disclaimer, the term of this patent is extended or adjusted under 35 U.S.C. 154(b) by 782 days.

This patent is subject to a terminal disclaimer.

(21) Appl. No.: 14/122,610

(22) PCT Filed: Jun. 9, 2011

(86) PCT No.: PCT/JP2011/003278
§ 371 (c)(1),
(2), (4) Date: Dec. 1, 2014

(87) PCT Pub. No.: WO2012/168977
PCT Pub. Date: Dec. 13, 2012

(65) Prior Publication Data
US 2015/0084450 A1    Mar. 26, 2015

(51) Int. Cl.
*H02K 19/24* (2006.01)
*H02K 19/26* (2006.01)
(Continued)

(52) U.S. Cl.
CPC .......... *H02K 19/26* (2013.01); *H02K 19/103* (2013.01); *H02K 19/24* (2013.01); *H02K 19/28* (2013.01); *H02K 7/11* (2013.01)

(58) Field of Classification Search
CPC ...... H02K 19/103; H02K 19/24; H02K 19/26; H02K 19/28
See application file for complete search history.

(56) References Cited

U.S. PATENT DOCUMENTS 4,095,149 A * 6/1978 Wanlass ................ H02K 17/08
                                          318/767
5,545,938 A   8/1996 Mecrow
(Continued)

FOREIGN PATENT DOCUMENTS

CN    101420138 A    4/2009
JP    7-504079       4/1995
(Continued)

OTHER PUBLICATIONS

International Search Report dated Aug. 9, 2011, in PCT/JP11/003278 filed Jun. 9, 2011.
(Continued)

*Primary Examiner* — Dang Le
(74) *Attorney, Agent, or Firm* — Oblon, McClelland, Maier & Neustadt, L.L.P.

(57) ABSTRACT

This rotating electric machine has a rotor, stator core, field windings for multiple poles, and armature windings for the multiple poles. The rotor is rotatably supported about a shaft. Convex-shaped multiple salient pole sections are formed on the outer circumference of the rotor while arranged in the circumferential direction. The stator core is provided along the outer circumference of the rotor with an air gap from the rotor. Convex-shaped multiple teeth are formed on the inner circumference of the stator core while arranged in the circumferential direction. The field windings for the multiple poles are wound around each of the multiple teeth while insulated from the field windings.

8 Claims, 4 Drawing Sheets

$p_f / p_a = 1.2$
$p_f = 24, p_a = 20, p_r = 22$

(51) Int. Cl.
*H02K 19/10* (2006.01)
*H02K 19/28* (2006.01)
*H02K 7/11* (2006.01)

(56) References Cited

U.S. PATENT DOCUMENTS

| | | | | |
|---|---|---|---|---|
| 5,780,949 | A * | 7/1998 | Li | H02P 25/092 310/166 |
| 9,559,557 | B2 * | 1/2017 | Tsuda | H02K 19/20 |
| 2003/0127931 | A1 | 7/2003 | Kusase et al. | |

FOREIGN PATENT DOCUMENTS

| | | |
|---|---|---|
| JP | 2003-199306 | 7/2003 |
| JP | 2009-106047 A | 5/2009 |
| JP | 2009-535012 | 9/2009 |

OTHER PUBLICATIONS

U.S. Appl. No. 14/131,093, filed Jan. 6, 2014, Tsuda, et al.
Combined Office Action and Search Report dated Jun. 3, 2015 in Chinese Patent Application No. 201180070702.1 with English translation of category of cited documents.

* cited by examiner $p_f / p_a = 1.2$ $p_f = 24, p_a = 20, p_r = 22$

FIG. 5

| $p_f/p_a=1.5$ | | | $p_f/p_a=1.2$ | | | $p_f/p_a=1.125$ | | |
|---|---|---|---|---|---|---|---|---|
| $p_f$ | $p_a$ | $p_r$ | $p_f$ | $p_a$ | $p_r$ | $p_f$ | $p_a$ | $p_r$ |
| 12 | 8 | 10 | 24 | 20 | 22 | 36 | 32 | 34 |
| 18 | 12 | 15 | 36 | 30 | 33 | 54 | 48 | 51 |
| 24 | 16 | 20 | 48 | 40 | 44 | 72 | 64 | 68 |
| 30 | 20 | 25 | 60 | 50 | 55 | 90 | 80 | 85 |
| 36 | 24 | 30 | 72 | 60 | 66 | 108 | 96 | 102 |
| 42 | 28 | 35 | 84 | 70 | 77 | 126 | 112 | 119 |
| 48 | 32 | 40 | 96 | 80 | 88 | 144 | 128 | 136 |
| ... | ... | ... | ... | ... | ... | ... | ... | ... |

ROTATING ELECTRIC MACHINE

TECHNICAL FIELD

The present invention relates to a rotating electric machine in which a stator has a field winding.

BACKGROUND ART

In general, a generator's output power increases as the number of revolutions (rotating speed) of a rotor increases. For example, a large capacity wind power generation system inputs thereto a rotational energy of a propeller. Usually, a rotating speed of the propeller is significantly low. When such a propeller is directly connected to a generator for power generation, a size of the generator needs to be huge. There is known an approach in which, in order to reduce the size of the generator, the rotating speed of the propeller is increased by a mechanical speed-up device having a gear.

In recent years, the capacity of the wind power generation has increased and, therefore, the above-mentioned mechanical speed-up device may fail to meet a required power generation capacity.

There is known, as an approach for solving this problem, a technology disclosed in, e.g., Patent Document 1 that uses a magnetic gear to obtain speed-up effect. The magnetic gear is a technology comparatively similar to the generator, allowing integration of the magnetic gear and generator. A rotating electric machine having the magnetic gear speeds up a rotating magnetic field using the magnetic gear and generates power in a three-phase armature winding based on the rotating magnetic field.

PRIOR ART DOCUMENTS

Patent Documents

Patent Document 1: Jpn. PCT National Publication No. 2009-535012

SUMMARY OF THE INVENTION

Problems to be Solved by the Invention

However, in a generator using a magnetic gear as disclosed in Patent Document 1, a rotor structure is complicated. The complicated structure of the rotor increases manufacturing cost.

The present invention has been made in view of the above situation, and an object thereof is to obtain speed-up effect by a magnetic gear in a rotating electric machine having a simpler structure.

Means for Solving the Problem

According to an embodiment, there is provided a rotating electric machine comprising: a rotor which is rotatably supported and which has, on its outer circumference, a plurality of convex-shaped salient pole sections arranged in a circumferential direction; a stator core which is disposed around the outer circumference of the rotor with an air gap formed therebetween and which has, on its inner circumference, a plurality of convex-shaped teeth arranged in a circumferential direction; field windings each of which is wound around each of the plurality of the teeth, each of the field windings forming a pole; and armature windings each of which is wound around each of the plurality of the teeth so as to be insulated from the field windings, forming a plurality of poles, wherein the number of the teeth and the number of the poles formed by the field windings are equal, and a ratio of the number of the poles formed by the field windings to the number of the poles formed by the armature windings is equal to a predetermined ratio, and the number of the salient pole sections formed in the rotor is equal to $(p_f+p_a)/2$, where $p_f$ is the number of the poles formed by the field windings, and $p_a$ is the number of the poles formed by the armature windings.

Advantage of the Invention

According to the present invention, it is possible to obtain speed-up effect of the magnetic gear in a rotating electric machine having a simpler structure.

BRIEF DESCRIPTION OF THE DRAWINGS

FIG. 5 is a table showing an example of a combination of $p_f$, $p_a$, and $p_r$ to be used in each embodiment of FIGS. 1, 3 and 4.

EMBODIMENTS FOR CARRYING OUT THE INVENTION

Embodiments of a rotating electric machine according to the present invention will be described below with reference to the drawings.

First Embodiment

Figure 1:
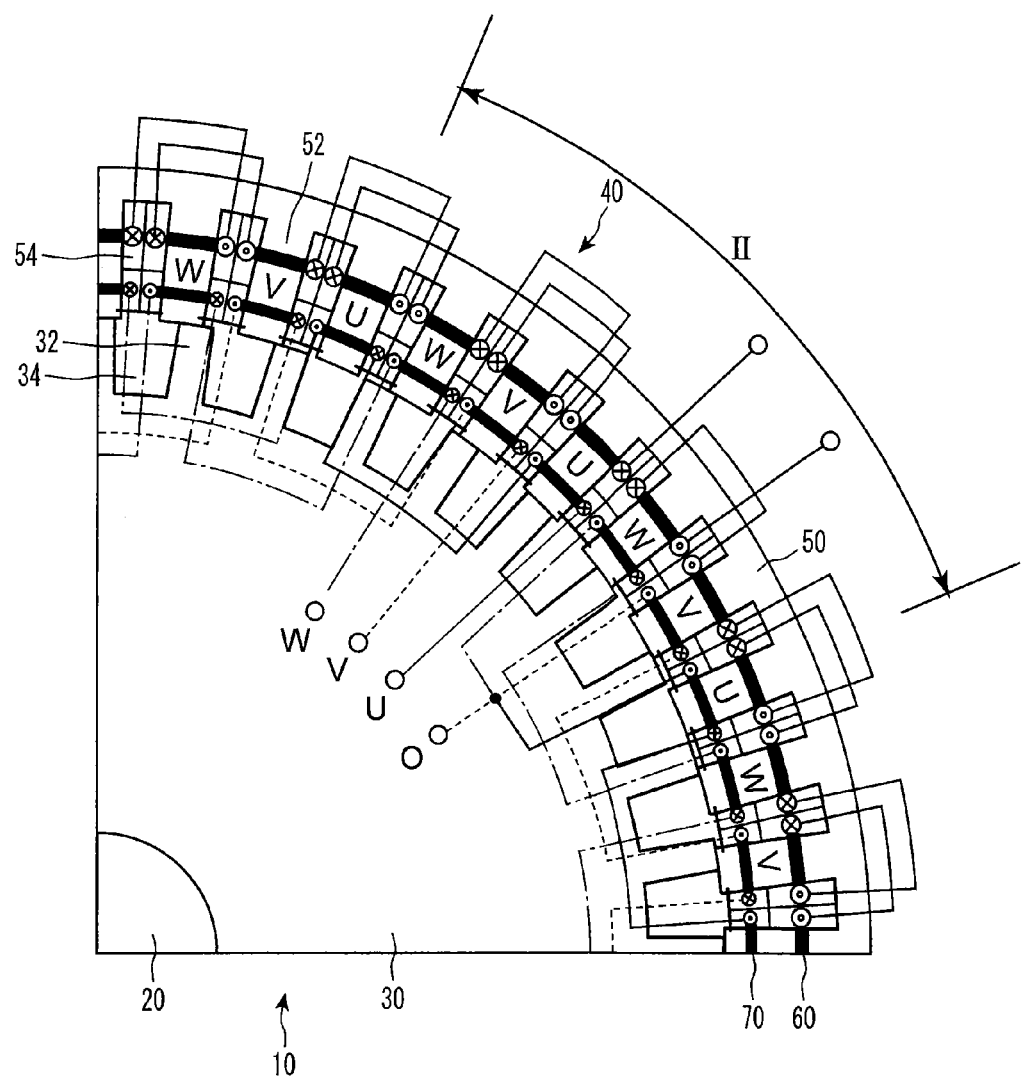
FIG. 1 is a partial cross-sectional view schematically illustrating a traverse cross-section of a quarter of a rotating electric machine according to a first embodiment of the present invention.
Figure 2:
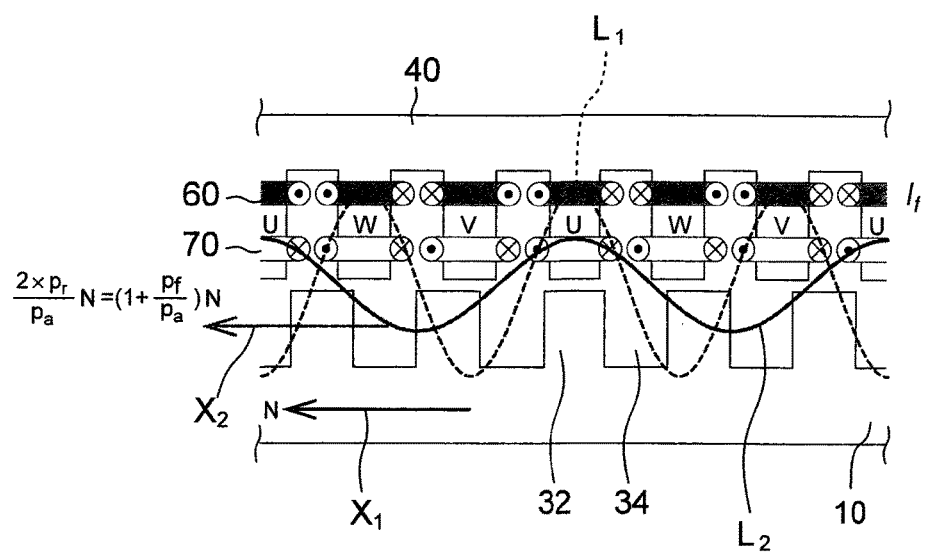
FIG. 2 is a schematic cross-sectional view of a stator and a rotor within a range II of FIG. 1, which is obtained by linearly developing a circumferential direction as viewed from an axial direction.

A first embodiment will be described using FIGS. 1 and 2. FIG. 1 is a partial cross-sectional view schematically illustrating a cross-section of a quarter of a rotating electric machine according to the present embodiment. FIG. 2 is a schematic cross-sectional view of a stator 40 and a rotor 10 within a range II of FIG. 1, which is obtained by linearly developing a circumferential direction as viewed from an axial direction.

First, a configuration of the rotating electric machine according to the present embodiment will be described. The rotating electric machine is a three-phase synchronous generator and includes a rotor 10 and a stator 40. The rotor 10 and the stator 40 are disposed inside a housing (not illustrated).

The rotor 10 is a salient-pole type rotor not provided with a winding and includes a main shaft 20 and a rotor core 30. The main shaft 20 extends coaxially with a rotation axis and rotatably supported by bearings (not illustrated) mounted in the housing.

The rotor core 30 is formed by laminating a plurality of silicon steel plates in the rotation axis direction, and is fixed to an outer circumference of the main shaft 20. And the rotor core 30 extends coaxially with the rotation axis. On the outer circumference of the rotor core 30, 40 convex-shaped (e.g., nearly rectangular in traverse cross section) salient pole sections 32 which are arranged in a circumferential direction at equal intervals to each other are formed. That is, a concave groove 34 is formed between adjacent salient pole sections 32.

In this example, the rotor core 30 has a length of 50 mm in the rotation axis direction and an outer radius (distance between a rotation axis center and leading end surfaces of the respective salient pole sections 32) of 255 mm.

The stator 40 includes a stator core 50, field windings 60 forming a plurality of poles, and three-phase armature windings 70 forming a plurality of poles.

The stator core 50 is formed by laminating a plurality of silicon steel plates in the rotation axis direction and is disposed around an outer circumference of the rotor 10 with an air gap formed therebetween. On the inner circumference of the stator core 50, 48 convex-shaped (e.g., substantially rectangular in traverse cross section) teeth 52 which are arranged in a circumferential direction at equal intervals from one another are formed. That is, a slot 54 is formed between adjacent teeth 52.

In this example, the stator core 50 has a length of 50 mm in the rotation axis direction, an outer radius of 315 mm, and a radial direction thickness (distance between leading end surfaces of the respective teeth 52 and an outer circumferential surface of the stator core 50) of 59.5 mm. Further, the stator core 50 is disposed such that a distance of the air gap (distance between the leading end surfaces of the respective salient pole section 32 and the leading end surfaces of the respective teeth 52) is 0.5 mm.

The field windings 60 are formed by winding conductive wires, such as copper wires, around each of the 48 teeth 52 in perpendicular to a radial direction (so-called "concentrated winding") through an insulator. Field windings 60 wound around adjacent teeth 52 are wound in an opposite direction and are connected in series to each other. To the field windings 60, field current is supplied from a DC power supply (not illustrated). Thus, in the present embodiment, the number of poles $p_f$ formed by the field windings 60 is 48, which is equal to the number of the teeth 52. The number of turns of the field windings 60 is 9,216.

The three-phase armature windings 70 are formed by winding conductive wires, such as copper wires, around each of the 48 teeth 52 in perpendicular to the radial direction (so-called "concentrated winding") through an insulator. The three-phase armature windings 70 are wound at an inward position in the radial direction relative to the position at which the field windings 60 are wound so as to be insulated from the field windings 60. The three-phase armature windings 70 wound around adjacent teeth 52 are wound in the same direction to each other.

The three-phase armature windings 70 includes three-phase (U-phase, V-phase, W-phase) windings which are star-connected to each other, and the windings of the U-phase, V-phase, W-phase are wounded in the sequentially circumferential direction around the 48 teeth 52 formed in the circumferential direction. Thus, the number of poles $p_a$ of the three-phase armature windings 70 is 32 (that is 48/3×2). The number of turns of the three-phase armature windings 70 is 528 for each phase.

Next, function of the present embodiment, that is, operation of the generator will be described. First, an operation principle of the generator will be described.

When the field windings 60 are excited by field current $I_f$ of direct current, a static magnetic field of $p_f$ poles (48 poles) is formed in the stator 40. The static magnetic field is denoted by a dashed line $L_1$ of FIG. 2. Then, the rotor 10 is driven at a rotating speed N [min$^{-1}$] (arrow $X_1$ in FIG. 2) by a power engine (not illustrated) provided outside the generator.

At this time, the static magnetic field is modulated in flux by the rotor 10 of $2 \times p_r$ poles (80 poles) obtained by the sum of the number of the salient pole sections 32 and the number of the concave grooves 34 (the salient pole sections and concave grooves are equivalent to N poles and S poles, respectively), and a rotating magnetic field of $p_a$ poles represented by the following equation (1) is generated. The rotating magnetic field is denoted by a continuous line $L_2$ of FIG. 2.

$$p_a = (2 \times p_r) - p_f \qquad \text{equation (1)}$$

In this example, $p_r=40$ and $p_f=48$, so that the number $p_a$ of poles is 32 (2×40−48), that is, 32-pole rotating magnetic field is generated.

In general, in a case where a speed-up device that speeds up the rotating speed mechanically is not used, the rotating magnetic field is uniquely determined by the field current $I_f$ and so on at a predetermined rotating speed. On the other hand, in the present embodiment, a size of the rotating magnetic field is larger than that determined by the field current $I_f$.

In this example, the 32-pole rotating magnetic field is equivalent to rotating field at a speed of 2.5 (=80 poles/32 poles) times the rotating speed N [min$^{-1}$] of the rotor 10 by the effect of the magnetic gear.

The rotating speed forming the rotating magnetic field is represented by $(2 \times p_r/p_a) \times N$, where N is a rotating speed to be actually input to the generator. When this expression is modified using the above equation (1), it is expressed as $(1+P_f/P_a) \times N$ (arrow $X_2$ in FIG. 2).

That is, the same effect as that obtained when a rotating speed of $(1+P_f/P_a)$ times the rotating speed to be input to the generator is input can be obtained. In this example, $p_a=32$ and $p_f=48$ are set such that a ratio between $p_a$ and $p_f$ satisfies a relationship: $p_f/p_a=1.5$, so that the rotating speed of 2.5 (1+48/32) times the rotating speed to be input to the generator can be obtained.

As a result, a three-phase AC current of a power generation frequency f [Hz] represented by the following equation (2) is induced in the armature windings 70.

$$f = (p_a/120) \times ((2 \times p_r)/p_a) \times N \qquad \text{equation (2)}$$

Note that an induced voltage V to be induced to the three-phase armature windings 70 is easily controlled by adjusting the field current $I_f$ to be supplied to the field windings 60.

Next, effects of the rotating electric machine according to the present embodiment will be described.

The rotor 10 of the present embodiment has 80 poles. The rotating magnetic field speeds up by 2.5 times by the effect of the magnetic gear. In general, a generator's output power is proportional to the rotating speed. However, according to the above effect, an output power per volume of 80-pole generator of this embodiment can be designed larger than that of a conventional 80-pole generator.

Further, although the generator of the present embodiment has the salient pole rotor having 80 poles, the field windings around the rotor poles are not needed, and power feeding to the rotor is not required. In addition, since the rotor 10 is configured as a salient pole rotor having a simpler structure, existing manufacturing technology can be used for manufacturing of the generator of the present embodiment. Thus, the present embodiment can obtain effect of the magnetic gear while preventing an increase in manufacturing cost of the generator and assembling man-hours.

As is clear from the above description, according to the present embodiment, it is possible to obtain effect of the magnetic gear in a rotating electric machine having a simpler structure.

Second Embodiment

Figure 3:
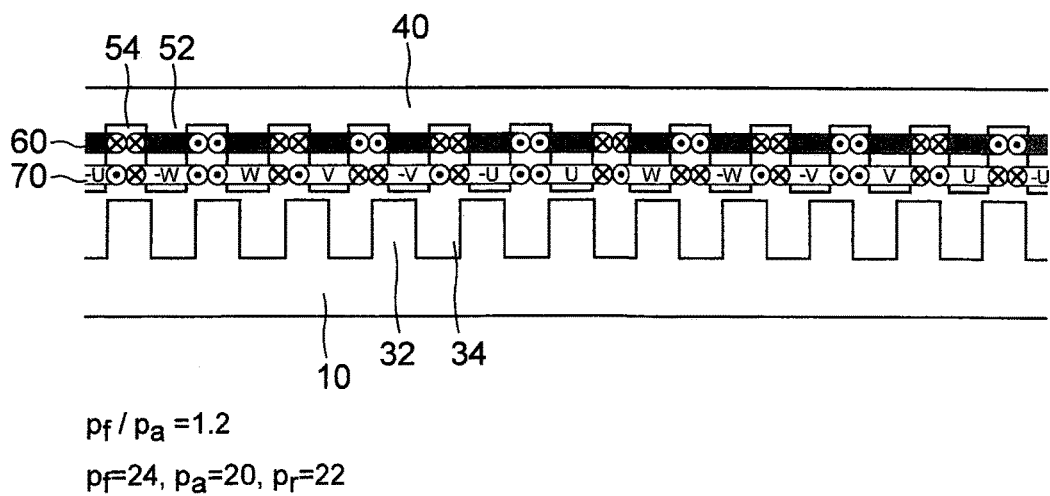
FIG. 3 is a schematic cross-sectional view of partially illustrating the stator and the rotor of the rotating electric machine according to a second embodiment of the present invention, which is obtained by linearly developing the circumferential direction as viewed from the axial direction.

A second embodiment will be described using FIG. 3. FIG. 3 is a schematic cross-sectional view of partially illustrating the stator and the rotor, which is obtained by linearly developing the circumferential direction as viewed from the axial direction. The present embodiment is a modification of the first embodiment (FIGS. 1 and 2), and the same reference numerals are given to the same or similar parts to those of the first embodiment, and the repeated description will be omitted.

In the present embodiment, the ratio between $p_a$ and $p_f$ satisfies a relationship: $p_f/p_a=1.2$. In this example, $p_a=20$ and $p_f=24$, so that the rotating speed is increased by 2.2 (1+24/20) times.

Thus, as in the first embodiment, it is possible to obtain effect of the magnetic gear in a rotating electric machine having a simpler structure.

Third Embodiment

Figure 4:
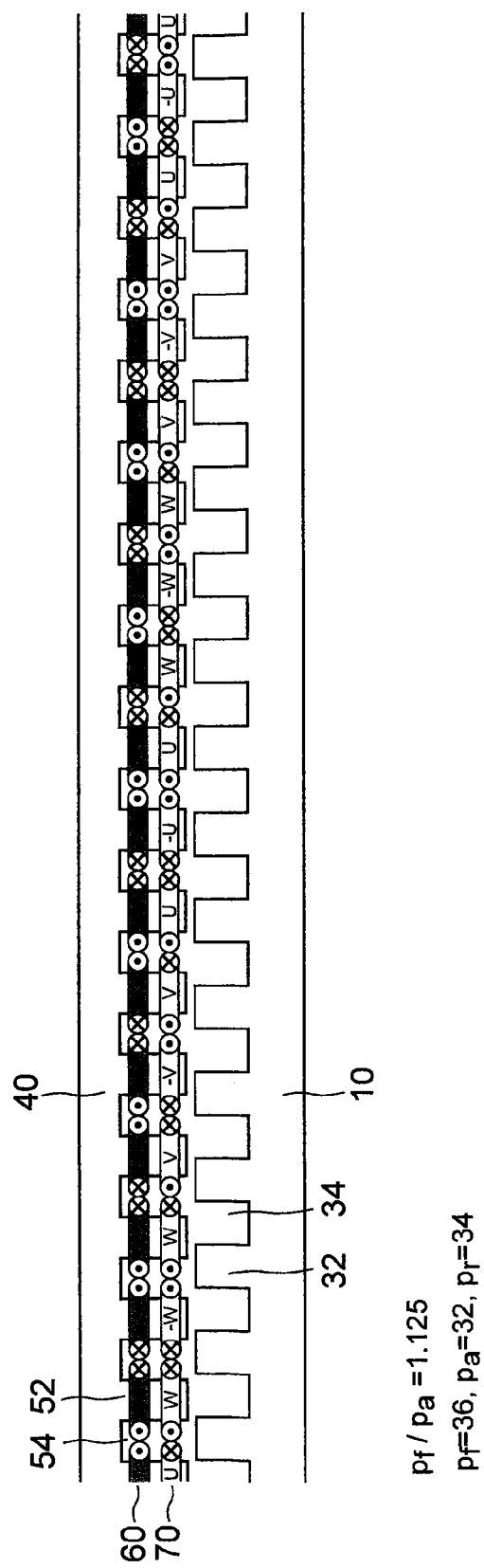
FIG. 4 is a schematic cross-sectional view of partially illustrating the stator and the rotor of the rotating electric machine according to a third embodiment of the present invention, which is obtained by linearly developing the circumferential direction as viewed from the axial direction.

A third embodiment will be described using FIG. 4. FIG. 4 is a schematic cross-sectional view of partially illustrating the stator and the rotor, which is obtained by linearly developing the circumferential direction as viewed from the axial direction. The present embodiment is a modification of the first embodiment (FIGS. 1 and 2), and the same reference numerals are given to the same or similar parts to those of the first embodiment, and the repeated description will be omitted.

In the present embodiment, the ratio between $p_a$ and $p_f$ satisfies a relationship: $p_f/p_a=1.125$. In this example, $p_a=32$ and $p_f=36$, so that the rotating speed is increased by 2.125 (1+36/32) times.

Thus, as in the first embodiment, it is possible to obtain effect of the magnetic gear in a rotating electric machine having a simpler structure.

Other Embodiments

The embodiments described above are merely given as examples, and it should be understood that the present invention cited in claims is not limited thereto. Further, the configurations of respective components of the present invention are not limited to the above embodiments but may be variously changed within the technical scope of the claims.

The $p_f/p_a$ are set to 1.5, 1.2, and 1.125, respectively, in the first to third embodiments, but not limited thereto.

FIG. 5 is a table showing an example of a combination of $p_f$, $p_a$, and $p_r$ in each of the first to third embodiments. As shown in the table of FIG. 5, there exist a large number of combinations that satisfy $p_f+p_a=(2 \times p_r)$ as that $p_f/p_a$ satisfies 1.5, 1.2 or 1.125. Any one of the combinations may be adopted. Then, a rotating magnetic field at a high speed can be generated from the salient poles of a rotor rotated slowly. That is, a large output power can be obtained from a rotating machine having a comparatively small body.

Although the star-connection is adopted for the armature windings 70 in each of the first to third embodiments, a delta-connection may be adopted.

Although the armature windings 70 are wound at an inward position in the radial direction relative to a position at which the field windings 60 are wound in each of the first to third embodiment, the armature windings 70 may be wound at an outward position in the radial direction relative to a position at which the field windings 60 are wound.

The present invention may be applied to a phase modifier.

EXPLANATION OF REFERENCE SYMBOLS

10: rotor
20: main shaft
30: rotor core
32: salient pole section
34: concave groove
40: stator
50: stator core
52: tooth
54: slot
60: field winding
70: armature winding

What is claimed is:

1. A rotating electric machine comprising:
   a rotor which is rotatably supported and which has, on its outer circumference, a plurality of convex-shaped salient pole sections arranged in a circumferential direction;
   a stator core which is disposed around the outer circumference of the rotor with an air gap formed therebetween and which has, on its inner circumference, a plurality of convex-shaped teeth arranged in a circumferential direction;
   field windings each of which is wound around each of the plurality of the teeth, each of the field windings forming a pole; and
   armature windings each of which is wound around each of the plurality of the teeth so as to be insulated from the field windings, forming a plurality of poles, wherein
   the number of the teeth and the number of the poles formed by the field windings are equal, and
   a ratio of the number of the poles formed by the field windings to the number of the poles formed by the armature windings is equal to a predetermined ratio, and the number of the salient pole sections formed in the rotor is equal to $(p_f+p_a)/2$, where $p_f$ is the number of the poles formed by the field windings, and $p_a$ is the number of the poles formed by the armature windings.

2. The rotating electric machine according to claim 1, wherein
   a rotating magnetic field is generated corresponding to that obtained by assuming that the rotor is rotated at a speed of $(1+p_f/p_a)$ times the actual rotating speed of the rotor.

3. The rotating electric machine according to claim 2, wherein
   a relationship between the number of the poles formed by the field windings and the number of the poles of the armature windings satisfies $p_f/p_a=1.5$.

4. The rotating electric machine according to claim 2, wherein
   a relationship between the number of poles formed by the field windings and the number of poles of the armature windings satisfies $p_f/p_a=1.2$.

5. The rotating electric machine according to claim 2, wherein
   a relationship between the number of poles formed by the field windings and the number of poles of the armature windings satisfies $p_f/p_a=1.125$.

6. The rotating electric machine according to claim 1, wherein
   a relationship between the number of the poles formed by the field windings and the number of the poles of the armature windings satisfies $p_f/p_a=1.5$.

7. The rotating electric machine according to claim 1, wherein
   a relationship between the number of poles formed by the field windings and the number of poles of the armature windings satisfies $p_f/p_a=1.2$.

8. The rotating electric machine according to claim 1, wherein
   a relationship between the number of poles formed by the field windings and the number of poles of the armature windings satisfies $p_f/p_a=1.125$.

* * * * *